United States Patent

Ivanto

[15] 3,690,574
[45] Sept. 12, 1972

[54] METHOD AND DISTRIBUTING OBJECTS OR GOODS AMONG A NUMBER OF CONSECUTIVELY PLACED POINTS OF CONSUMPTION OR STORAGE

[72] Inventor: Osmo Juhani Ivanto, Pohjoispuistokatu 10, Hyvinkaa, Finland

[22] Filed: Jan. 21, 1971

[21] Appl. No.: 108,564

Related U.S. Application Data

[63] Continuation of Ser. No. 752,815, Aug. 15, 1968, abandoned.

[52] U.S. Cl..................................241/281, 198/83
[51] Int. Cl...............................................B02c 1/08
[58] Field of Search..........198/66, 67, 68, 83, 43, 45, 198/50; 241/281, 280

[56] References Cited

UNITED STATES PATENTS 1,921,577   8/1933   Nelson..........................198/85

3,297,263   1/1967   Hedberg....................241/281

FOREIGN PATENTS OR APPLICATIONS 245,486   2/1966   Austria........................198/66

Primary Examiner—Richard E. Aegerter
Attorney—Waters, Roditi, Schwartz & Nissen

[57] ABSTRACT

A method for distributing objects or goods among a number of consecutively placed points of consumption or storage from a conveyor which is composed of several consecutively arranged belt, chain, rope or other conveyors on which the objects or goods have been arranged to be transported from one conveyor to the other and to be distributed among the points of consumption or storage through the spaces between conveyors. The invention is characterized in that the gaps between the conveyors are constantly kept open and filled with the material itself which is being handled.

3 Claims, 2 Drawing Figures

METHOD AND DISTRIBUTING OBJECTS OR GOODS AMONG A NUMBER OF CONSECUTIVELY PLACED POINTS OF CONSUMPTION OR STORAGE

This application is a continuation of application Ser. No. 752,815, now abandoned.

BRIEF SUMMARY OF THE INVENTION

In some previously known devices the openings between the conveyors have been arranged to be closed with the aid of hatches so that the material which is being handled moves from one conveyor to the other over the intervening hatch. In some other previously known devices the openings are closed by changing the length of the conveyors or by displacing the conveyors.

The present invention is based on the principle that the material to be handled is itself used to close the openings or spaces between conveyor members. Accordingly, the conveyors are longitudinally spaced at a given distance from each other at the depositing points. This space is kept continuously filled with the material which is being handled.

Accordingly as material is taken away or consumed in this space, the material in the space descends and new material comes from the conveyor to replace it, and the material moves from one conveyor to the other over a bridge formed by the material in the space or opening.

One of the applications of the invention is the distribution of timber among the machines in a barking plant or pulp grinding plant. The present invention is particularly suitable for use in feeding continuous-feed grinders.

DETAILED DESCRIPTION

Figure 1:
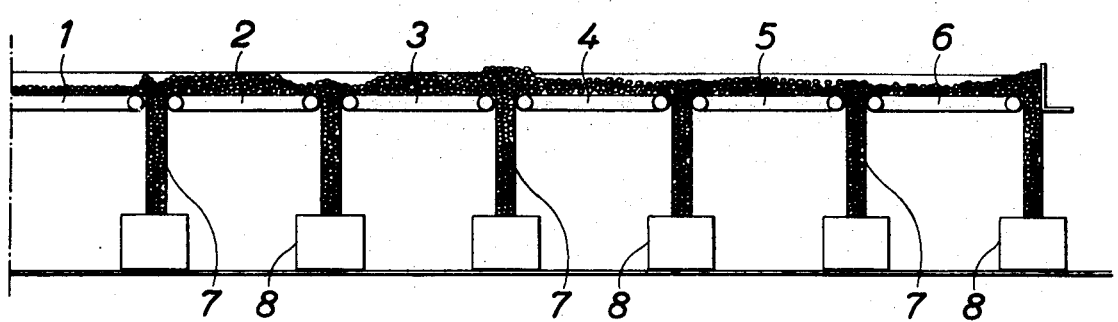

The invention is described below with reference to the attached drawing, in which FIG. 1 shows the conveyor arrangement as viewed from the side.

Figure 2:
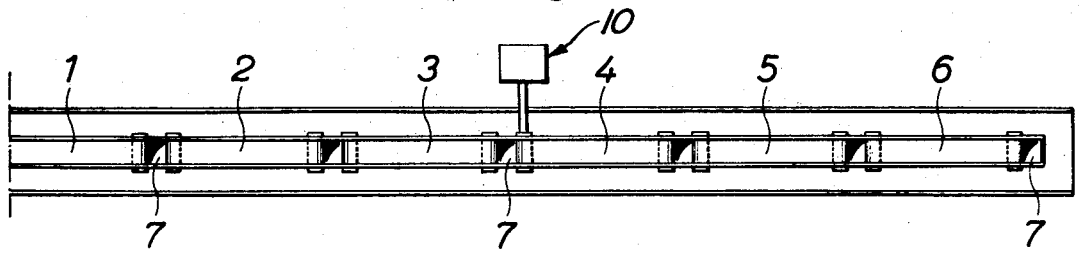

FIG. 2 shows the conveyor arrangement as viewed from above. According to FIG. 1 the conveyor arrangement is composed of the belt conveyors 1-6.

Each conveyor has its own driving unit 10. At both ends of each conveyor belt, rolls have been provided, the one foremost in the direction in which the timber travels preferably being the roll providing traction. The conveyors may be used in either direction, however. The reference numeral 7 indicates the points of timber consumption or storage, e.g., the chutes communicating with the top of the grinders. The reference numeral 8 indicates the grinder device or equipment consuming timber for removing the timber from the chute. The material which is being handled, in the instance illustrated by the drawing consisting of pieces of timber lying transversally on the conveyor track, travels in a thick layer from left to right along the conveyor track. The thickness of the layer may be increased by suitably stopping or starting the individual conveyors or by changing their speed. The invention, the method, and the device afford the obvious advantage that the previously used hatches and displacement of the conveyors or of their ends are not required at all.

As the pile of timber in the funnel or chute 7 is consumed at its lower end, it descends and new pieces of timber from the timber flow join the upper end of the pile. When the conveyors adjacent to the funnel 7 no longer move, timber rolls into the funnel from the pile existing above it. The gap which is thus produced in the flow of timber can be filled by starting the conveyors. When the material to be handled is timber, it is most conveniently presented to the first conveyor in the line of conveyors by means of a combined log lift conveyor.

The foregoing description and the drawing attached to it are only intended to illustrate the inventive idea. Different embodiments of the invention may obviously vary within the scope of the subsequently presented claim.

I claim:

1. Apparatus for grinding logs, said apparatus comprising a plurality of horizontally disposed conveyors at substantially the same elevation, said conveyors being consecutively spaced from one another in the direction of conveyor feed, channel means defining a substantially vertical channel between successive spaced conveyors for receiving logs conveyed by said conveyors to contain the logs in a pile, grinding means at the bottom of each channel for grinding the logs conveyed into said channel means, said conveyors being operatively associated with said channel means and the piles of logs therein to form a continuous stream of logs extending from one conveyor to the next adjacent conveyor over the pile of logs disposed in the intermediate channel, said conveyors each comprising an endless belt, and a pair of spaced rollers for driving each said belt, belt drive units for driving said belts in either direction, said belts being spaced at a fixed distance from one another, the width of said channel means being substantially greater than the diameter of the logs such that at least two logs are contained in said channel means in a horizontal disposition at substantially the same elevation while the logs are stacked on the conveyors in irregular fashion, and a fixed end wall at the last channel means to block advance of the logs therebeyond.

2. Apparatus as claimed in claim 1, wherein said vertical channel is open at the upper end thereof and communicates directly with the space between adjacent conveyors.

3. Apparatus as claimed in claim 2 wherein said conveyors occupy fixed positions above said grinding means in a common horizontal plane.

* * * * *

UNITED STATES PATENT OFFICE
CERTIFICATE OF CORRECTION

Patent No. __3,690,574__　　　　　　Dated __September 12, 1972__

Inventor(s) __Osmo Juhani Ivanto__

It is certified that error appears in the above-identified patent and that said Letters Patent are hereby corrected as shown below:

On the cover sheet, insert -- [30] August 18, 1967 Finland    2223/67 -- .

Signed and sealed this 27th day of March 1973.

(SEAL)
Attest:

EDWARD M. FLETCHER, JR.　　　　　　ROBERT GOTTSCHALK
Attesting Officer　　　　　　　　　　Commissioner of Patents